(12) United States Patent
Gomez Andueza et al.

(10) Patent No.: US 10,641,247 B2
(45) Date of Patent: May 5, 2020

(54) PRE-ASSEMBLY SLAB SYSTEM FOR CONCRETE WIND TURBINE TOWERS AND METHOD FOR ASSEMBLING A PRE-ASSEMBLY SLAB SYSTEM FOR CONCRETE WIND TURBINE TOWERS

(71) Applicant: NORDEX ENERGY SPAIN, S.A.U., Barasoain (ES)

(72) Inventors: Asier Gomez Andueza, Barasoain (ES); Vanesa Cerrillo Gomez, Barasoain (ES); Ivan Garcia Maestre, Barasoain (ES); Teresa Arlaban Gabeiras, Barasoain (ES); Ander Gaston Lujambio, Barasoain (ES); Jose Luis Aristegui Lantero, Barasoain (ES); Jose Miguel Garcia Sayes, Barasoain (ES); Miguel Nunez Polo, Barasoain (ES)

(73) Assignee: NORDEX ENERGY SPAIN, S.A.U., Barasoain (ES)

( * ) Notice: Subject to any disclaimer, the term of this patent is extended or adjusted under 35 U.S.C. 154(b) by 0 days.

(21) Appl. No.: 16/031,214

(22) Filed: Jul. 10, 2018

(65) Prior Publication Data
US 2019/0010723 A1    Jan. 10, 2019

(30) Foreign Application Priority Data

Jul. 10, 2017    (EP) ...................................... 17382446

(51) Int. Cl.
*F03D 13/20* (2016.01)
*E02D 27/42* (2006.01)
(Continued)

(52) U.S. Cl.
CPC ............. *F03D 13/22* (2016.05); *E02D 5/523* (2013.01); *E02D 27/016* (2013.01); *E02D 27/425* (2013.01); *E04H 12/12* (2013.01)

(58) Field of Classification Search
CPC .... E02D 5/24; E02D 5/30; E02D 5/52; E02D 5/523; E02D 5/526; E02D 27/016;
(Continued)

(56) References Cited

U.S. PATENT DOCUMENTS

| 7,841,143 | B2 * | 11/2010 | Jensen | ..................... E02D 27/42 52/296 |
| 10,139,037 | B2 * | 11/2018 | Spronken | .............. F16B 5/0635 |

(Continued)

FOREIGN PATENT DOCUMENTS

| AT | 405067 B | 5/1999 |
| EP | 1645693 A1 | 4/2006 |

(Continued)

*Primary Examiner* — Andrew J Triggs
(74) *Attorney, Agent, or Firm* — Hayes Soloway PC

(57) ABSTRACT

The present invention relates to a pre-assembly slab system for concrete wind turbine towers, wherein the pre-assembly slabs can be transported to the vicinity of the tower of another wind turbine in the same wind farm or in another wind farm and be reused for the assembly of this other tower. The invention further relates to a method for assembling the pre-assembly slab system for concrete wind turbine towers.

16 Claims, 7 Drawing Sheets

(51) Int. Cl.
*E02D 5/52* (2006.01)
*E02D 27/01* (2006.01)
*E04H 12/12* (2006.01)

(58) Field of Classification Search
CPC ....... E02D 13/22; E02D 27/425; F03D 13/22; E04H 12/12
See application file for complete search history.

(56) References Cited

U.S. PATENT DOCUMENTS

| | | | |
|---|---|---|---|
| 10,202,734 B2 * | 2/2019 | Spronken | E02D 27/42 |
| 10,309,074 B2 * | 6/2019 | Tozer | E02D 27/016 |
| 2008/0040983 A1 | 2/2008 | Fernandez Gomez et al. | |
| 2011/0194900 A1 * | 8/2011 | French, Sr. | E02D 17/20 |
| | | | 405/229 |
| 2012/0167499 A1 * | 7/2012 | Knisel | F03D 13/22 |
| | | | 52/231 |
| 2014/0205384 A1 * | 7/2014 | French, Sr. | E02D 17/20 |
| | | | 405/229 |
| 2015/0337516 A1 * | 11/2015 | French, Sr. | E02D 17/20 |
| | | | 52/173.3 |
| 2016/0032610 A1 * | 2/2016 | Arlaban Gabeiras | E04H 12/12 |
| | | | 52/745.03 |
| 2017/0183840 A1 * | 6/2017 | Tozer | E02D 27/016 |
| 2018/0172199 A1 * | 6/2018 | Spronken | F16B 5/0635 |
| 2019/0010723 A1 * | 1/2019 | Gomez Andueza | E04B 1/043 |

FOREIGN PATENT DOCUMENTS

| | | |
|---|---|---|
| EP | 2980337 A1 | 3/2016 |
| WO | 2016066345 A1 | 5/2016 |

\* cited by examiner

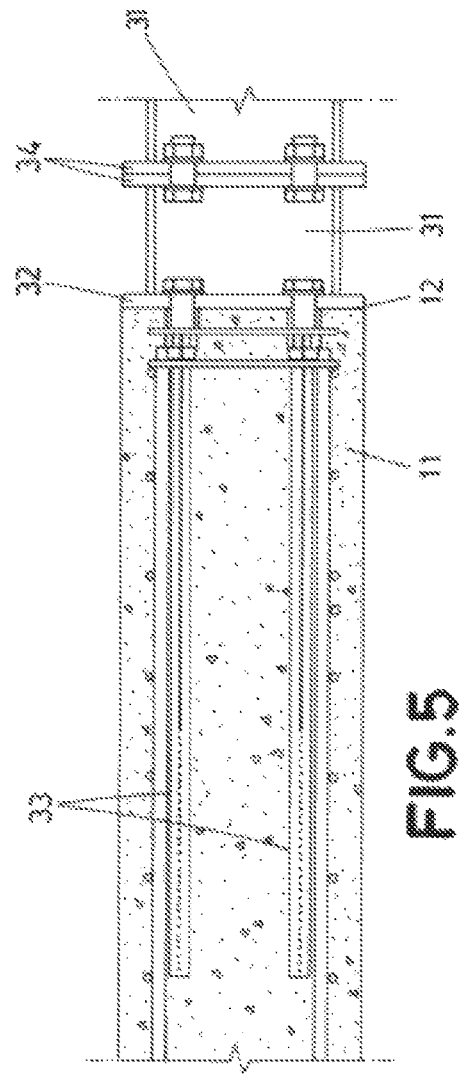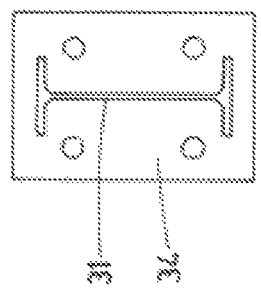

PRE-ASSEMBLY SLAB SYSTEM FOR CONCRETE WIND TURBINE TOWERS AND METHOD FOR ASSEMBLING A PRE-ASSEMBLY SLAB SYSTEM FOR CONCRETE WIND TURBINE TOWERS

CROSS-REFERENCE TO RELATED APPLICATIONS

This patent application claims the benefit of and priority to EP Patent Application No. 17382446.7, filed on Jul. 10, 2017. The disclosure of this patent application is herein incorporated by reference in its entirety.

DESCRIPTION

Subject Matter of the Invention

The present invention relates to a pre-assembly slab system for concrete wind turbine towers, wherein the pre-assembly slabs can be transported to the vicinity of the tower of another wind turbine in the same wind farm or in another wind farm and be reused for the assembly of this other tower.

The invention further relates to a method for assembling the pre-assembly slab system for concrete wind turbine towers.

BACKGROUND OF THE INVENTION

Usually, the pre-assembly of the different sections of a concrete wind turbine tower is carried out in the vicinity of the foundation of said tower.

In order to implement said pre-assembly, metallic assembly platforms are placed on one or several concrete slabs that are manufactured in-situ as part of the civil works destined to the adaptation of the vicinity of the wind farm and carried out prior to the installation of the wind turbines.

Subsequently, in order to implement the pre-assembly of the different concrete tower sections, the pre-assembly of complete sections can be carried out by joining segments, executing the vertical joints between them on the ground in the vicinity of the base of the tower and later assembling the sections on top of each other. Said method greatly facilitates the assembly of the tower, by carrying out most of the operations on the ground. This is the procedure protected by U.S. Pat. No. 7,765,766B2. Said assembly procedure comprises two stages:

A stage for the pre-assembly of sections, in which the segments that form a section are assembled at the base of the tower and the vertical concrete joints are executed between segments, and A hoisting and stacking stage in which the already pre-assembled sections are placed one on top of the other.

The present invention solves the previous drawbacks associated with concrete slabs, which are manufactured in-situ as part of the civil works for the adaptation of the vicinity of the wind farm and carried out prior to the installation of the wind turbines.

DESCRIPTION OF THE INVENTION

The present invention relates to a pre-assembly slab system for concrete wind turbine towers wherein the concrete tower comprises at least two sections and wherein each of the sections comprises at least two segments.

The pre-assembly slab system comprises at least one pre-assembly slab of at least one concrete tower section configured to support and transmit to the ground the stresses associated with at least one concrete tower section, wherein the at least one pre-assembly slab is prefabricated.

Thus, it is possible to transport the pre-assembly slab system to the vicinity of the tower of another wind turbine of the same wind farm or of another wind farm and reuse the slab system for the assembly of this other tower, since at least one prefabricated pre-assembly slab is configured to be transported.

Preferably, the at least one pre-assembly slab of the pre-assembly slab system is made of concrete, preferably comprising a reinforcement.

Preferably, the at least one pre-assembly slab of the pre-assembly slab system is annular, such that by eliminating the central area with respect to the slabs of the state of the art manufactured in-situ, the amount of material used in the manufacturing thereof is reduced.

Each of the pre-assembly slabs comprises first fastening elements configured to allow the pre-assembly slab to be hoisted as whole, preferably configured to hold the pre-assembly slab in a horizontal position during hoisting.

Optionally, the at least one pre-assembly slab of the pre-assembly slab system is modular, comprising at least two modules.

Thus, since the at least one pre-assembly slab is modular, the size of each of the at least two modules of the at least one pre-assembly slab is smaller than the size of said pre-assembly slab, which enables transporting the modules by road or rail, such that it is possible to reuse the slab system for the assembly of another tower of another wind turbine.

In case the at least one pre-assembly slab is modular, said pre-assembly slab optionally comprises a joining means between the modules to provide mechanical integrity to the pre-assembly slab so that it can be hoisted in a single stage for transportation to another location. This enables hoisting and transporting the pre-assembly slab to another wind turbine tower inside the same wind farm since there are fewer transport restrictions in terms of dimensions and weights carried on wind farm roads with respect to existing restrictions for transport by road or rail.

Optionally, each of the pre-assembly slabs comprises second fastening elements configured to enable separate hoisting of each of the modules of the pre-assembly slab, preferably configured to hold each of the modules in a horizontal position during hoisting.

Thus, when the pre-assembly slabs are transported prior to the construction of a wind farm from another wind farm or from a logistic center, they are disassembled, i.e., they are transported by modules, allowing the dimensions of said modules not to exceed the maximum allowed dimensions for transportation by road or rail. Due to the second fastening elements, each module of a pre-assembly slab is hoisted and arranged in the vicinity of the foundation of the concrete tower of the wind turbine, the modules being subsequently joined together by means of the joining means between the modules. These operations are repeated for each of the pre-assembly slabs of the pre-assembly slab system for concrete wind turbine towers.

Once the assembly of the concrete tower of a wind turbine has been completed, the slab system is transported to the location of the concrete tower of another wind turbine, transporting the complete pre-assembly slabs, i.e., all of its modules joined together by means of the joining means between modules, wherein, due to the first fastening elements, each of the pre-assembly slabs is hoisted and arranged in the vicinity of the concrete tower of the wind turbine, thus reducing hoist and transportation operations for the construction of the wind farm.

Optionally, the slab system comprises at most as many pre-assembly slabs as concrete tower sections are comprised in the concrete tower. In the event that each concrete tower section is assembled on a pre-assembly slab, the slab system comprises at least as many pre-assembly slabs as concrete tower sections less one unit comprised in the concrete tower, since the first concrete tower section is assembled directly on a foundation of the wind turbine concrete tower. In the event that the sections are pre-assembled concentrically in the pre-assembly slabs, such that at least two sections of the concrete tower are pre-assembled on a pre-assembly slab simultaneously, the pre-assembly slab system comprises fewer pre-assembly slabs than concrete tower sections. In the event that the tower is mixed, i.e., with part of the sections being concrete and another part being metallic, for example, the pre-assembly slab system comprises less pre-assembly slabs than tower sections.

The size and amount of material of each of the pre-assembly slabs is adapted according to the geometry and weight of the tower sections arranged on the pre-assembly slabs which support and transmit to the ground the stresses associated with at least one concrete tower section. This way, and since the wind turbine towers are usually decreasing in diameter with respect to height, for a system of pre-assembly slabs with at least two pre-assembly slabs, a pre-assembly slab of a section that is closer to the base of the tower will have a larger outer perimeter and a larger contact surface with the ground than a pre-assembly slab of an upper section.

Preferably, the pre-assembly slab system for concrete wind turbine towers comprises at least two pre-assembly slabs of at least two different dimensions. It is especially advantageous that the outer size and the surface of the slabs are adapted according to the perimeter of the sections to be assembled. Thus, the amount of material used in the manufacture of the slab system is optimized according to the dimensions of the sections. For example, in a frustoconical tower, the sections closest to the base have a larger perimeter than the sections that are further away from the base. In this case, it is advantageous if the slabs configured for pre-assembly of the sections closest to the base have a larger outer perimeter and preferably a larger surface area than the slabs configured for pre-assembly of the sections further away from the base of the tower.

Preferably, each of the pre-assembly slabs comprises a constant thickness.

Preferably, the thickness is less in a first pre-assembly slab with a greater contact surface with the ground, i.e., in a first pre-assembly slab configured to support and transmit to the ground the stresses associated with a first tower section closer to the base of the tower, than the thickness of a second pre-assembly slab with a smaller contact surface with the ground, i.e., in a second pre-assembly slab configured to support and transmit to the ground the stresses associated with a second tower section further away from the base of the tower than the first tower section. This is particularly beneficial in the case of frustoconical towers, in which the perimeter of a first tower section closer to the base of the tower is larger than the perimeter of a second tower section further away from the base of the tower than the first tower section.

Optionally, the pre-assembly slab system of the present invention further comprises support elements of the concrete tower sections configured to be arranged on each of the pre-assembly slabs Preferably, the support elements are removable. In this case, each of the pre-assembly slabs comprises third fastening elements configured to anchor said support elements, wherein, optionally, the fastening elements are embedded in the pre-assembly slabs.

The method for assembling the pre-assembly slab system for concrete wind turbine towers, wherein the concrete tower comprises at least two sections and wherein each of the sections comprises at least two segments, comprises:

a stage for precasting at least one pre-assembly slab of at least one concrete tower section wherein the at least one pre-assembly slab is configured to support and transmit to the ground the stresses associated with at least one concrete tower section.

Preferably, the stage for precasting at least one pre-assembly slab of at least one concrete tower section comprises the following substages:

a substage for assembling at least one mold, which in turn comprises:

at least one substage for assembling a reinforcement; and a substage for pouring the material of the pre-assembly slab into the at least one mold, the pre-assembly slab material being preferably concrete.

The method further comprises a stage for assembling the pre-assembly slab system in the vicinity of the wind turbine tower.

The method further comprises a first stage for transporting the pre-assembly slab system to the vicinity of the tower of another wind turbine of the same wind farm or of another wind farm, which enables reusing the slab system for the assembly of this other tower, since at least one prefabricated pre-assembly slab is configured to be transported.

Preferably, the stage for precasting the at least one pre-assembly slab of the pre-assembly slab system is a stage for precasting by means of concrete laying, preferably by means of concrete laying with a reinforcement.

The stage for assembling the pre-assembly slab system in the vicinity of the wind turbine tower in turn comprises:

a substage for hoisting carried out by means of hoisting means of the at least pre-assembly slab of the pre-assembly slab system.

Preferably, the substage for hoisting of the stage for assembling is a substage for hoisting the at least one pre-assembly slab of the pre-assembly slab system in a horizontal position.

Optionally, the stage for precasting the at least one pre-assembly slab of at least one concrete tower section, the at least one pre-assembly slab being modular and comprising at least two modules, is carried out for each of the modules.

In this exemplary embodiment, the substage for hoisting carried out by means of hoisting means of the at least one pre-assembly slab of the slab system, of the stage for assembling, comprises a substage for hoisting carried out by means of hoisting means for each of the modules of the at least one pre-assembly slab, the substage for hoisting preferably being a substage for hoisting at least one of the modules of the at least one pre-assembly slab of the pre-assembly slab system in a horizontal position.

In this exemplary embodiment, the stage for assembling the pre-assembly slab system in the vicinity of the wind turbine tower in turn comprises a stage for joining the modules of the at least one pre-assembly slab by means of joining means between the modules.

The stage for assembling is carried out for each of the pre-assembly slabs of the pre-assembly slab system for concrete wind turbine towers in the method of the present invention.

The method further comprises a second stage for transporting the pre-assembly slab system prior to the stage for assembling the pre-assembly slab system in the vicinity of the wind turbine tower, wherein this second stage for transporting is a stage for transporting at least one pre-assembly slab by modules. This is possible because the dimensions of said modules are smaller than those of the pre-assembly slab and do not exceed the maximum dimensions allowed for transportation by road or rail.

The method further comprises a stage for hoisting carried out by means of hoisting means, of at least one pre-assembly slab of the slab system, prior to the first stage for transporting the pre-assembly slab system to the vicinity of the tower of another wind turbine of the same wind farm or of another wind farm.

Preferably, the stage for hoisting is a stage for hoisting the at least one pre-assembly slab of the pre-assembly slab system in a horizontal position.

Optionally, the stage for assembling the pre-assembly slab system in the vicinity of the wind turbine tower in turn comprises a substage for positioning support elements on the concrete tower sections that are arranged on each of the pre-assembly slabs.

The present invention also relates to a method for assembling a concrete wind tower comprising the stage for precasting the at least one pre-assembly slab of at least one concrete tower section, the stage for assembling the slab system in the vicinity of the wind turbine tower, and also the following stages:
a stage for placing and positioning at least one subset of a tower section formed by at least two segments on the at least one pre-assembly slab;
a stage for provisional or definite execution of the joints between segments of at least one subset of the tower section by joining at least two segments; and
a stage for stacking the at least one subset of the tower section onto an immediately lower tower section.

The present invention also relates to a method for assembling a wind farm comprising the stage for precasting the at least one pre-assembly slab of at least one concrete tower section, at least one stage for assembling the slab system in the vicinity of the wind turbine tower and at least a first stage for transporting the pre-assembly slab system to the vicinity of the tower of another wind turbine of the same wind farm.

The method for assembling a wind farm further comprises the following stages for each of the wind turbine towers of the wind farm:
a stage for placing and positioning at least one subset of a tower section formed by at least two segments on the at least one pre-assembly slab;
a stage for provisional or definite execution of the joints between segments of at least one subset of the tower section by joining at least two segments; and
a stage for stacking at least one subset of the tower section onto an immediately lower tower section.

BRIEF DESCRIPTION OF THE DRAWINGS

FIG. 5 shows a CC cross-section view of FIG. 4 wherein the joining means between modules can be seen.

FIG. 6 shows a GG cross-section view of FIG. 5.

PREFERRED EMBODIMENT OF THE INVENTION

In a preferred embodiment of the invention, the pre-assembly slab system for concrete wind turbine towers is used to carry out the pre-assembly of at least two sections of the concrete tower, the following example having six tower sections, not considered limiting, wherein each of the sections comprises at least two segments (not shown), wherein the first concrete tower section is assembled directly on a foundation of the concrete wind turbine tower.

The pre-assembly slab system therefore comprises five pre-assembly slabs (10), each of which is used for pre-assembling one of the five concrete tower sections, from the second to the fifth, the five slabs (10) being pre-assembled and prefabricated, preferably of concrete, preferably comprising a reinforcement (12).

Figure 1:
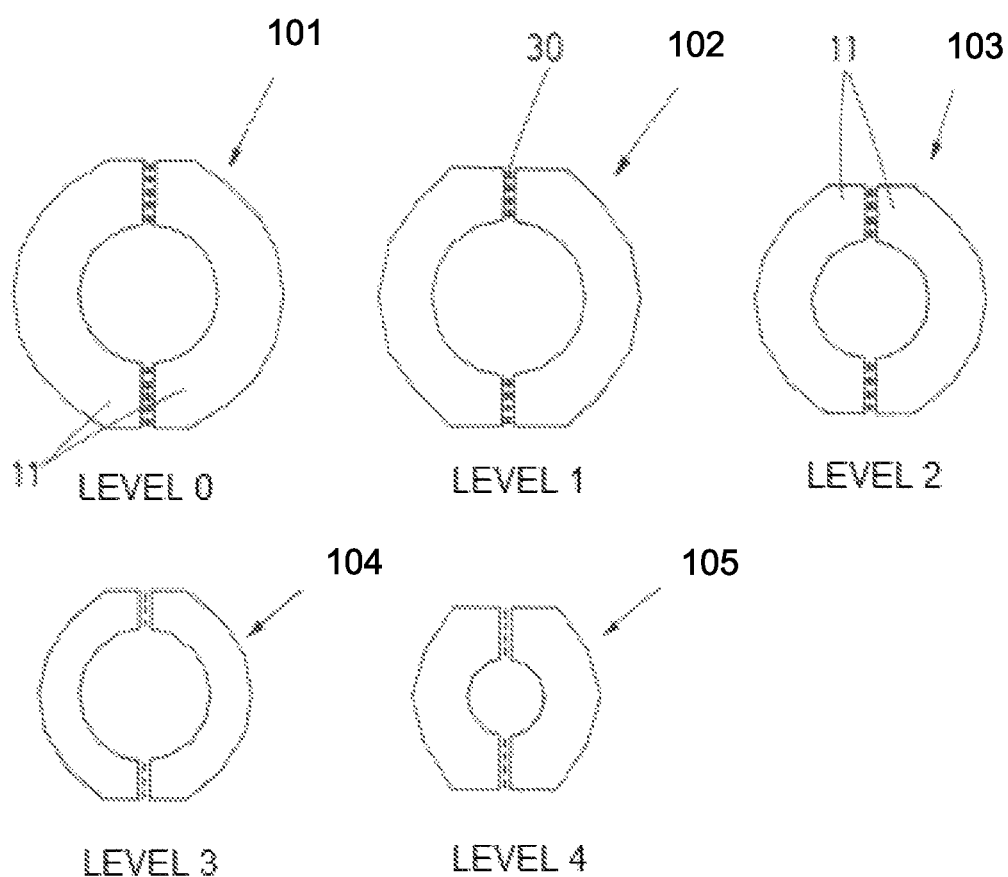
FIG. 1 shows a plan view of the pre-assembly slab system for concrete wind turbine towers of the present invention with 5 pre-assembly slabs for as many tower sections.

The pre-assembly slabs (10) are annular and as shown in FIG. 1, the amount of material used in the manufacture thereof by eliminating the central area with respect to the slabs of the state of the art manufactured in-situ.

Figure 2:
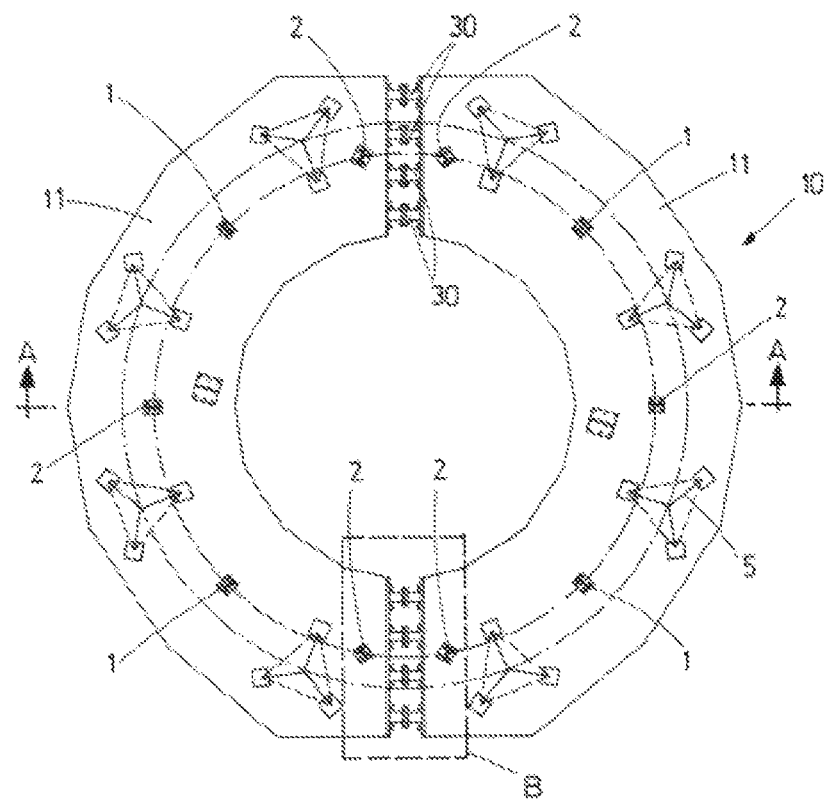
FIG. 2 shows a plan view of the pre-assembly slab of the pre-assembly slab system corresponding to the third section of the tower.
Figure 3:
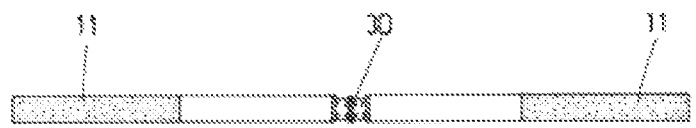
FIG. 3 shows an AA cross-section view of FIG. 2.
Figure 4:
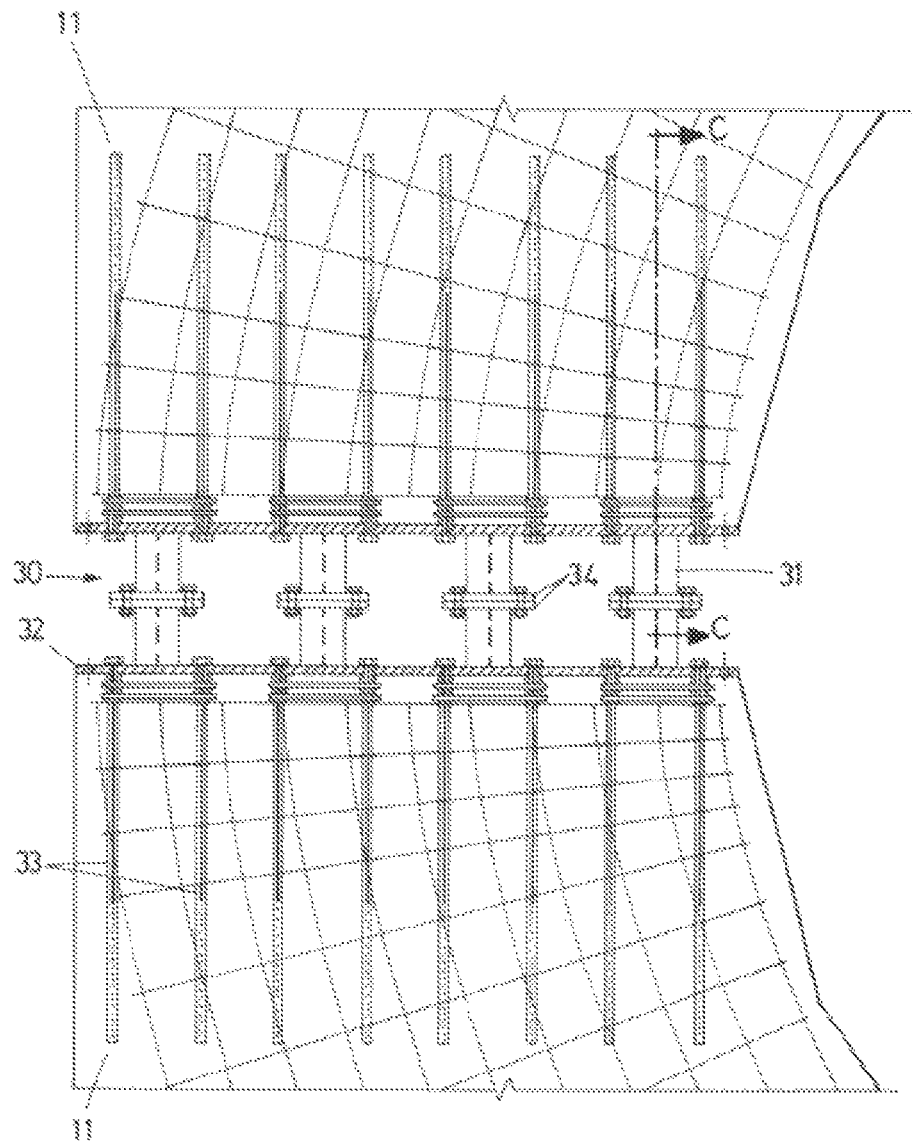
FIG. 4 shows detail B of FIG. 2.
Figure 7:
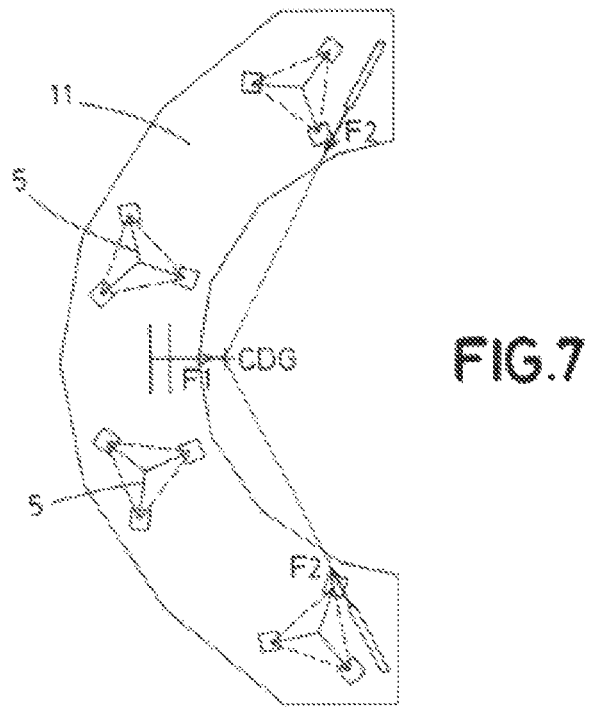
FIG. 7 shows a plan view of one of the two modules of a pre-assembly slab, wherein the force diagram is represented supported by the second fastening elements, with stress F1 in the center of the module and two F2 stresses at the ends of the modules, stresses F1 and F2 converging at the center of gravity CDG, from which the hoisting is carried out with a resulting stress of W, shown in FIG. 8.
Figure 8:
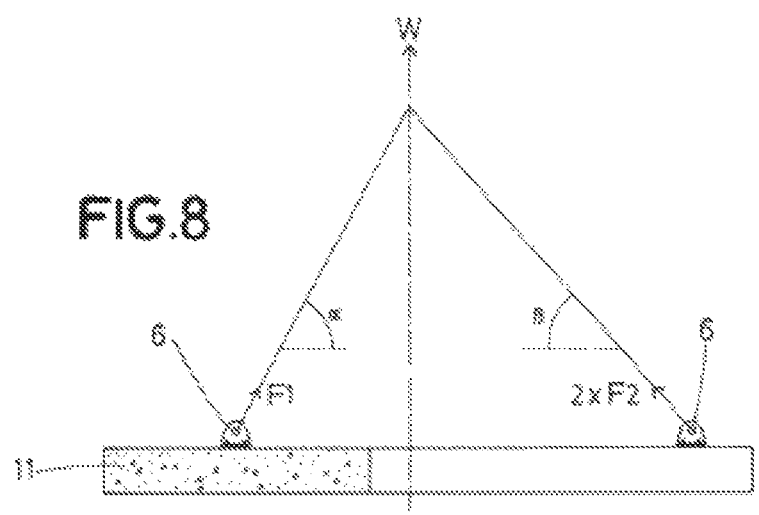
FIG. 8 shows an elevation view of FIG. 7, wherein angle α forming the horizontal with stress F1 and angle β forming the horizontal with stresses F2 can be seen.
Figure 9:
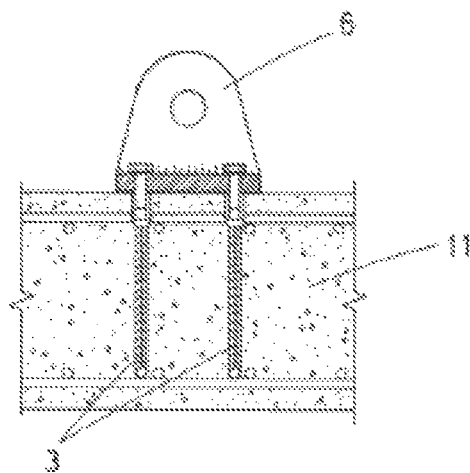
FIG. 9 shows an elevation sectional view of a first or a second fastening element shown in FIG. 7.
Figure 10:
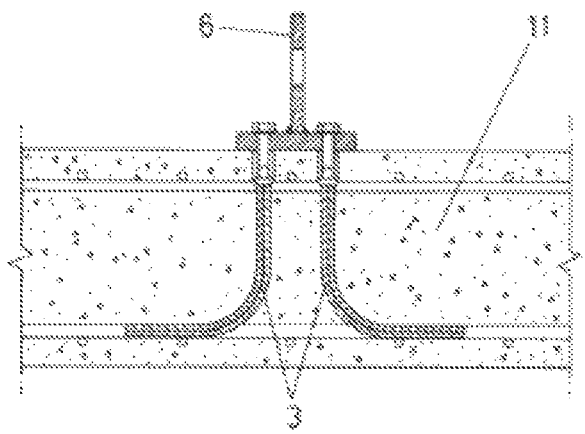
FIG. 10 shows a sectional side view of the first or the second fastening element shown in FIG. 7.

Each of the pre-assembly slabs (10) comprises first fastening elements (1) configured to allow the pre-assembly slab (10) to be hoisted as whole, by holding the pre-assembly slab (10) in a horizontal position. These first fastening elements (1) can be seen in FIG. 2 for the pre-assembly slab (10) of the fourth section of the tower.

Preferably, the pre-assembly slabs (10) of the pre-assembly slab system are modular, each of the pre-assembly slabs (10) comprising two modules (11) as shown in FIG. 1 although the number of modules (11) of the pre-assembly slabs (1) of the slab system of the present invention may be greater than 2.

Thus, since the pre-assembly slabs (10) are modular, the size of each of the modules (11) that make up each pre-assembly slab (10) is smaller than the size of said pre-assembly slab (10), which enables transporting the modules

(11) by road or rail, such that it is possible to reuse the slab system for the assembly of another tower of another wind turbine.

Each pre-assembly slab (10) comprises joining means (30) between the modules (11) to provide mechanical integrity to the pre-assembly slab (10) so that it can be hoisted in a single stage for transportation thereof to another location. These joining means (30) between the modules (11) comprise joining profiles (31), preferably IPE profiles, and steel sheets (32), wherein the joining profiles (31) are joined to a steel sheet (32) arranged on a joining flank (12) of each of the modules (11), and wherein the steel sheets (32) are joined to the modules (11) through inner bars (33) that are embedded in the module (11) once the concrete has set. The joining means (30) between the modules (11) further comprise central joining plates (34) arranged between two joining profiles (31) of adjacent modules (11) and these joining plates (34) are joined by screws. Thus, it is possible to transport the modules (11) by road or by rail, once the joining means (30) between the modules (11) have been removed.

Each of the pre-assembly slabs (10) comprises second fastening elements (2) configured to enable separate hoisting of each of the modules (11) of the pre-assembly slab (10), holding each of the modules (11) in a horizontal position.

The first fastening elements (1) and/or the second fastening elements (2) comprise anchors (3) embedded in the pre-assembly slab (10) the anchors (3) being preferably Halfen-type inserts or the like. Preferably, the first fastening elements (1) and/or the second fastening elements (2) comprise lugs (6) that enable hoisting the pre-assembly slab (10) or each of the modules (11) of the pre-assembly slab (10) respectively.

In this preferred embodiment of the invention, the wind turbine tower is formed by sections of decreasing diameter with respect to the height, whereby the pre-assembly slab (10) of the section closest to the base of the tower, which is the second section of the tower, will have a larger contact surface with the ground and preferably a larger outer perimeter than the pre-assembly slab (10) of the third section of the tower, and so on up to the pre-assembly slab (10) of the sixth section of the tower, which will have the smallest contact surface and preferably the smallest outer perimeter of the five pre-assembly slabs (10) of the pre-assembly slab system for concrete wind turbine towers of the present invention according to this embodiment. This minimizes the material used in the manufacture of the pre-assembly slabs (10).

Each of the pre-assembly slabs (10) comprises a constant thickness, wherein the thickness may be less in those pre-assembly slabs with a larger contact surface with the ground, i.e., for example, the thickness is less in a first pre-assembly slab (101) with a greater contact surface with the ground, i.e., the thickness is less in a first pre-assembly slab (101) configured to support and transmit to the ground the stresses associated with a first tower section closer to the base of the tower than a second tower section, than the thickness of a second pre-assembly slab (102) with a smaller contact surface with the ground, i.e., the thickness is greater in a second pre-assembly slab (102) configured to support and transmit to the ground the stresses associated with the second tower section that is further away from the base of the tower than the first tower section. This is particularly beneficial in the case of frustoconical towers, in which the perimeter of a first tower section closer to the base of the tower than a second tower section is larger than the perimeter of the second tower section that is further away from the base of the tower than the first tower section.

In another preferred embodiment, wherein the first concrete tower section is assembled directly on the foundation of the concrete wind turbine tower, the thickness is less in a first pre-assembly slab (101) corresponding to the second section of the tower than in a second pre-assembly slab (102) corresponding to the third section of the tower, and so one, up to a fifth pre-assembly slab (105) corresponding to the sixth section of the tower. This also minimizes the material used in the manufacture of the pre-assembly slabs (10). In another example, the thickness is less in the first pre-assembly slab (101) than in the rest of the pre-assembly slabs (102, 103, 104, 105) wherein the thickness is the same.

The pre-assembly slab system further comprises support elements (5) of the sections of the concrete tower, support elements (5) that are configured to be arranged on each of the pre-assembly slabs (10) wherein the support elements (5) are preferably tripods.

The method for assembling the pre-assembly slab system for concrete wind turbine towers, wherein the concrete tower comprises at least two sections and wherein each of the sections comprises at least two segments, comprises:

a stage for precasting at least one pre-assembly slab (10) of at least one concrete tower section wherein the at least one pre-assembly slab (10) is configured to support and transmit to the ground the stresses associated with at least one concrete tower section.

Preferably, the stage for precasting the at least one pre-assembly slab of the pre-assembly slab system is a stage for precasting by means of concrete laying, preferably by means of concrete laying with a reinforcement.

The method further comprises a stage for assembling the pre-assembly slab system in the vicinity of the wind turbine tower comprising a substage for hoisting, carried out by means of hoisting means, of the at least one pre-assembly slab (10) of the slab system, wherein the substage for hoisting is preferably a substage for hoisting the at least one pre-assembly slab (10) of the pre-assembly slab system in a horizontal position.

The stage for assembling the pre-assembly slab system in the vicinity of the wind turbine tower in turn comprises a substage for positioning support elements (5) of the concrete tower sections that are arranged on each of the pre-assembly slabs (10).

The method further comprises a first stage for transporting the pre-assembly slab system to the vicinity of the tower of another wind turbine of the same wind farm or of another wind farm, which enables reusing the slab system for the assembly of this other tower, since the at least one prefabricated pre-assembly slab (10) is configured to be transported.

Figure 11:
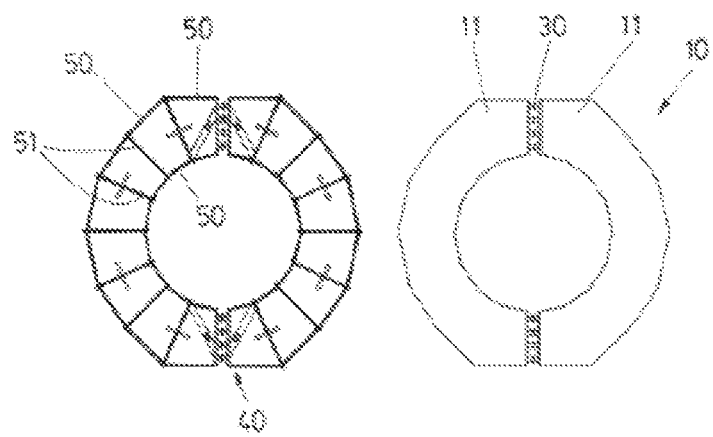
FIG. 11 shows a plan view of the stage for precasting at least one pre-assembly slab of at least one concrete tower section by means of two molds carried out in one phase.
Figure 12:
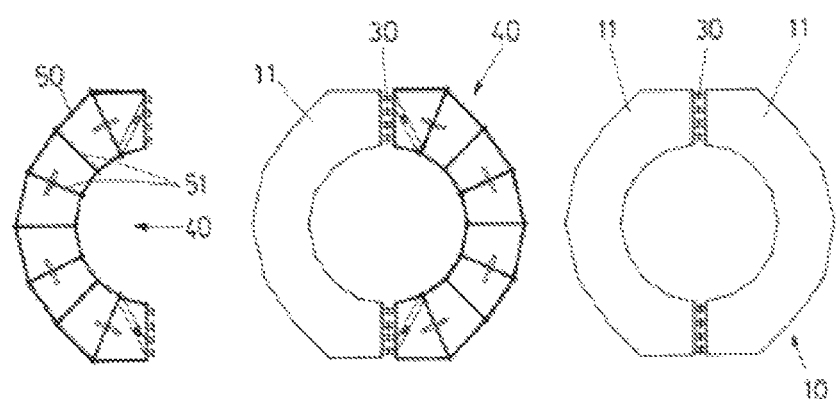
FIG. 12 shows a plan view of the stage for precasting at least one pre-assembly slab of at least one concrete tower section by means of one mold carried out in two phases.

In another preferred embodiment, the stage for precasting the at least one pre-assembly slab (10) of at least one concrete tower section, the at least one pre-assembly slab (10) being modular and comprising at least two modules (11), is carried out for each of the modules (11), in a single phase by means of two molds, as shown in FIG. 11, or in two phases by means of one mold, as seen in FIG. 12.

In this exemplary embodiment, the substage for hoisting carried out by means of hoisting means of the at least one pre-assembly slab (10) of the slab system, of the stage for assembling, comprises a substage for hoisting carried out by means of hoisting means for each of the modules (11) of the at least one pre-assembly slab (10), the substage for hoisting preferably being a substage for hoisting at least one of the modules (11) of the at least one pre-assembly slab (10) of the pre-assembly slab system in a horizontal position.

In this exemplary embodiment, the stage for assembling the pre-assembly slab system in the vicinity of the wind turbine tower in turn comprises a stage for joining the modules (11) of the at least one pre-assembly slab (10) by means of joining means (30) between the modules (11).

The stage for assembling is carried out for each of the pre-assembly slabs (10) whether they are modular or not, of the pre-assembly slab system for concrete wind turbine towers in the method for assembling concrete wind turbine towers of the present invention, wherein the slab system comprises as many pre-assembly slabs (10) as concrete tower sections less one unit comprised in the concrete tower, since the first concrete tower section is assembled directly on the foundation of the concrete tower of the wind turbine.

The method further comprises a second stage for transporting the pre-assembly slab system prior to the stage for assembling the pre-assembly slab system in the vicinity of the wind turbine tower, wherein this second stage for transporting is preferably a stage for transporting the at least one pre-assembly slab (10) by modules (11). This is possible because the dimensions of said modules (11) are smaller than those of the corresponding pre-assembly slab (10) and do not exceed the maximum dimensions allowed for transportation by road or rail.

The method further comprises a stage for hoisting carried out by means of hoisting means, of the at least one pre-assembly slab (10) of the slab system, prior to the first stage for transporting the pre-assembly slab system to the vicinity of the tower of another wind turbine of the same wind farm or of another wind farm, the stage for hoisting being preferably a stage for hoisting the at least one pre-assembly slab (10) of the pre-assembly slab system in a horizontal position.

The stage for precasting at least one pre-assembly slab of at least one concrete tower section comprises the following substages:
 a substage for assembling at least one mold (40), which in turn comprises:
  a substage for assembling as set of profiles (50) on side faces of the at least one mold (40);
  a substage for positioning formwork panels, which in turn preferably comprises a substage for applying a stripping material on an inner face of the formwork panels;
  a substage for assembling a reinforcement (51); and
  a substage for closing the at least one mold (40) by means of transverse profiles;
 a substage for pouring the material of the pre-assembly slab (10) into the at least one mold (40), the pre-assembly slab (10) material being preferably concrete.

What follows is a detailed description of the stage for precasting at least one modular pre-assembly slab (10) comprising at least two modules (11), which is carried out for each of the modules (11) in a single phase by means of two molds (40), as shown in FIG. 11, or in two phases by means of one mold (40), as shown in FIG. 12, wherein each of the phases comprises:
 a substage for assembling at least one mold (40), which in turn comprises:
  a substage for assembling as set of profiles (50) on side faces of the mold or molds (40);
  a substage for positioning formwork panels, which in turn preferably comprises a substage for applying a stripping material on an inner face of the formwork panels;
  a substage for assembling a reinforcement (51); and
  a substage for closing the mold or molds (40) by means of transverse profiles;
 a substage for pouring the material of the pre-assembly slab (10) into the mold or molds, preferably concrete.

If the stage for precasting at least one modular pre-assembly slab (10) comprising at least two modules (11) is carried out so that the modules (11) are arranged in the final arrangement presented in the pre-assembly slab (10), said stage for precasting further comprises:
 a substage for placing joining means (30) between the modules. This ensures the fit of the joining means (30) between the modules in said modules (11) if a single mold is used as shown in FIG. 11, shifting the position thereof in order to prefabricate the second mold once the first mold has been prefabricated, or if two molds are used, as shown in FIG. 12.

If the stage for precasting at least one modular pre-assembly slab (10) comprising at least two modules (11) is not carried out so that the modules (11) are arranged in the final arrangement presented in the pre-assembly slab (10), said stage for precasting further comprises:
 a substage for controlling the geometry of the mold or molds prior to the substage of pouring the material of the pre-assembly slab (10) in the mold or molds and prior to a
 substage for placing joining means (30) between the modules.

The invention claimed is:

1. A pre-assembly slab system for concrete wind turbine towers, wherein the concrete tower comprises at least two tower sections and wherein each of the sections comprises at least two segments, wherein the system comprises at least a first pre-assembly slab and a second pre-assembly slab, each one of the pre-assembly slabs configured to support and transmit to a ground stresses associated with at least one concrete tower section of the at least two tower sections, wherein the first pre-assembly slab and the second pre-assembly slab are prefabricated, wherein each of the pre-assembly slabs comprises a constant thickness, wherein the thickness is less in the first pre-assembly slab comprising a first contact surface with the ground and a first perimeter than in the second pre-assembly slab comprising a second contact surface with the ground and a second perimeter, wherein the first contact surface and the first perimeter are larger than the second contact surface and the second perimeter, respectively, wherein the first pre-assembly slab is configured to support and transmit to the ground the stresses associated with a first section of the tower closer to a base of the tower than a second section of the tower and the second pre-assembly slab is configured to support and transmit to the ground the stresses associated with the second section of the tower that is further away from the base of the tower than the first section of the tower.

2. The system of claim 1, wherein the first pre-assembly slab and the second pre-assembly slab are configured to be transported.

3. The system of claim 1, wherein the first pre-assembly slab and the second pre-assembly slab are made of concrete, comprising a reinforcement.

4. The system of claim 1, wherein the first pre-assembly slab and the second pre-assembly slab are annular.

5. The system of claim 1, wherein the first pre-assembly slab and the second pre-assembly slab comprises first fastening elements configured to allow each one of the first pre-assembly slab and the second pre-assembly slab to be hoisted as a whole, the first fastening element configured to hold each of the first pre-assembly slab and the second pre-assembly slab in a horizontal position during hoisting.

6. The system of claim 5 wherein the first fastening elements comprise anchors embedded in the first pre-assembly slab and in the second pre-assembly slab.

7. The system of claim 6, wherein the first fastening elements comprise lugs that allow the first pre-assembly slab and the second pre-assembly slab or each of the modules of the first pre-assembly slab and the second pre-assembly slab respectively to be hoisted.

8. The system of claim 1, wherein the first pre-assembly slab and the second pre-assembly slab are modular, comprising at least two modules.

9. The system of claim 8, wherein the first pre-assembly slab and the second pre-assembly slab comprises joining means between the modules.

10. The system of claim 9, wherein the joining means between the modules comprise joining profiles and steel sheets, wherein the joining profiles are joined to a steel sheet arranged on a joining flank of each of the modules, and wherein the steel sheets are joined to the modules through inner bars that are embedded in the module once the concrete has set.

11. The system of claim 10, wherein the joining means between the modules further comprise central joining plates arranged between two joining profiles of adjacent modules, joining plates that are joined by screws.

12. The system of claim 10 wherein the first pre-assembly slab and the second pre-assembly slab comprises second fastening elements configured to allow separate hoisting of each of the modules of the first pre-assembly slab and the second pre-assembly slab, configured to hold each of the modules in a horizontal position during hoisting.

13. The system of claim 1, wherein it comprises at least two slabs of at least two different dimensions.

14. The system of claim 1, wherein each of the first pre-assembly slab and the second pre-assembly slab comprises a size and is made up of an amount of material configured to adapt to a geometry and weight of the section of the at least one concrete tower section arranged on each of the first pre-assembly slab and the second pre-assembly slab.

15. The system of claim 1, further comprising support elements of the sections of the concrete tower configured to be arranged on each of the first pre-assembly slab and the second pre-assembly slab.

16. A pre-assembly slab system for concrete wind turbine towers, wherein the concrete tower comprises at least two concrete tower sections and wherein each of the sections comprises at least two segments, wherein the system comprises at least a first pre-assembly slab and a second pre-assembly slab, each one of the pre-assembly slabs configured to support and transmit to a ground stresses associated with at least one concrete tower section of the at least two concrete tower sections, wherein the first pre-assembly slab and the second pre-assembly slab are prefabricated, modular, each one of them comprising at least two modules and joining means between the modules, wherein the first pre-assembly slab and the second pre-assembly slab are configured to be hoisted to be transported from the ground of a wind turbine tower location to another wind turbine tower location inside a same wind farm with the at least two modules joined together by means of the joining means between modules.

* * * * *